J. McNEIL & R. LIENHARD, Jr.
ELASTIC SPRING SUPPORT.
APPLICATION FILED NOV. 27, 1912.
1,093,143.
Patented Apr. 14, 1914.
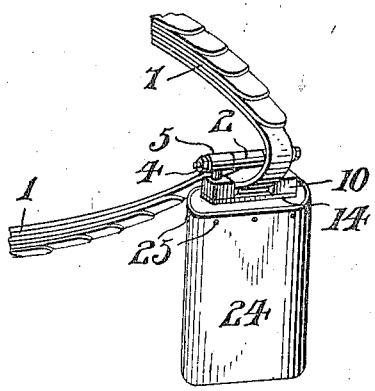
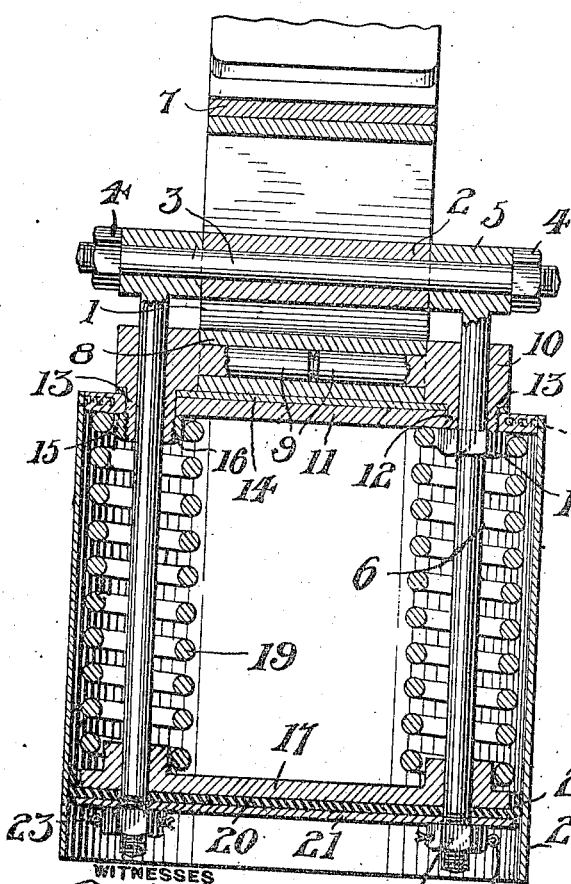
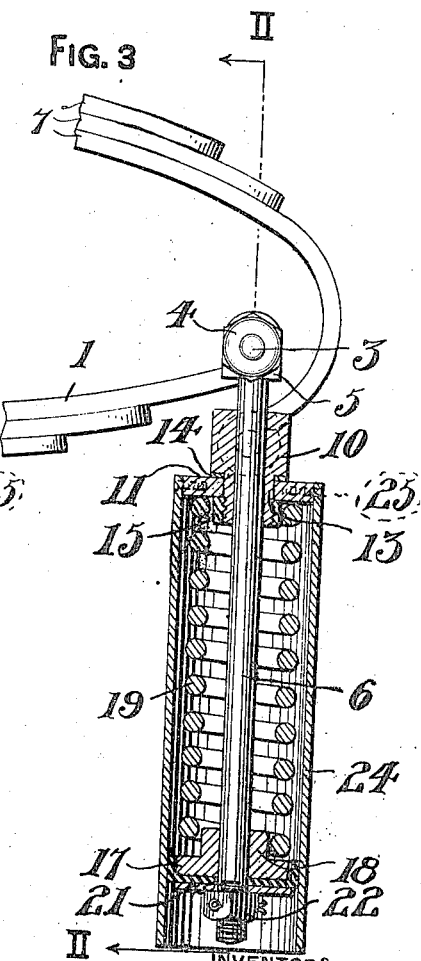
WITNESSES
INVENTORS
James McNeil & Robert Lienhard Jr.
ATTORNEYS.

UNITED STATES PATENT OFFICE.

JAMES McNEIL AND ROBERT LIENHARD, JR., OF PITTSBURGH, PENNSYLVANIA.

ELASTIC SPRING-SUPPORT.

1,093,143. Specification of Letters Patent. Patented Apr. 14, 1914.

Application filed November 27, 1912. Serial No. 733,913.

*To all whom it may concern:*

Be it known that we, JAMES McNEIL and ROBERT LIENHARD, Jr., citizens of the United States of America, residing at Pittsburgh, in the county of Allegheny and State of Pennsylvania, have invented certain new and useful Improvements in Elastic Spring-Supports, of which the following is a specification, reference being had therein to the accompanying drawing.

This invention relates to an elastic spring support especially designed as a shock absorber for vehicles.

The primary object of our invention is to furnish a vehicle with suspension springs that insure comfort, reduce the wear and tear upon tires and engine and greatly facilitate the speed of a vehicle.

Another object of our invention is to provide a shock absorber that can be easily fitted to a car having various types of springs and without modification to existing frame work.

A further object of this invention is to provide an elastic spring coupling that is dust proof, positive in its action, capable of withstanding the great weight of a vehicle body, and highly efficient for insuring comfort while traveling on the roughest roads at the greatest rate of speed.

With the above and other objects in view the invention resides in the novel construction, combination and arrangement of parts to be hereinafter specifically described and then claimed.

Reference will now be had to the drawing, wherein:—

Figure 1 is a perspective view of the shock absorber as applied to a portion of a laminated or leaf spring, Fig. 2 is an enlarged vertical sectional view of the shock absorber, and Fig. 3 is a cross sectional view of the same, showing a line II—II representing the section line of Fig. 2.

Further describing our invention in detail with reference to the accompanying drawing, wherein like numerals denote corresponding parts throughout: 1 denotes a portion of the lower leaf or laminated spring of a vehicle and extending through the barrel 2 of said spring is a bolt 3. Detachably mounted upon the ends of said bolt and retained thereon by nuts 4 or other fastening means are the longitudinally apertured T heads 5 of suspension rods 6.

7 denotes a portion of the upper leaf or laminated spring of a vehicle and extending into the barrel 8 of said spring are confronting stud bolts 9 carried by heads 10 slidably mounted upon the suspension rods 6.

11 denotes an oblong spacer plate slidably mounted upon the rods 6, said plate having openings 12 for tubular bosses 13 carried by the heads 10.

14 denotes a liner arranged upon the plate 11 between the heads 10 and the barrel 8, this liner compensating for any inequalities between the plate 11 and the barrel 8, whereby the barrel 8 will have a firm bearing relatively to the plate 11. In some instances the liner can be dispensed with.

15 denotes nuts screwed upon the lower threaded ends 16 of the bosses 13, said nuts supporting the spacer plate 11.

17 denotes an oblong support movably arranged upon the lower ends of the suspension rods 6 and the top of said support has bosses 18 confronting the nuts 15. Encircling the bosses 18 and the nuts 15 are the end convolutions of coiled compression springs 19.

20 denotes an oblong gasket arranged against the lower side of the support 17, said gasket being made of leather, rubber or other yieldable material. The gasket is retained in position by a face plate 21 held upon the rods 6 by nuts 22, cotter pins 23 or other fastening means.

24 denotes an oval casing having the upper edges thereof connected to the edges of the spacer plate 11, as at 25 and said casing incloses the rods 6 and the springs 19 and has the inner walls thereof engaged by flanged edges 26 of the gasket 20. The flanged edges of said gasket exclude dust, dirt and other matter which would tend to impair or injure the springs 19. Furthermore the gasket 20 operates upon the principle of a piston within the casing 24 and in connection with the latter retains lubricant therein. The casing 24 is of sufficient size whereby the outer sides thereof can have placed thereon a license member or an advertisement.

From the foregoing it will be observed that the suspension rods 6 are supported by the lower spring 1 and that the support 17 is retained upon the lower ends of said rods. When a weight or pressure is brought to bear upon the upper spring 7, the heads 10 of the stud bolts tend to shift downwardly upon the suspension rods and place the springs 19 under compression, these springs cushioning a downward movement of the upper spring relatively to the lower spring, and as the springs are inclosed they are not susceptible to injury by stone bruise.

The weight or pressure brought to bear upon the upper spring 7 acts directly upon the spacer plate 11 or the liner 14 without any undue stress or strain upon the stud bolts 9. These bolts normally position the end of the upper spring 7 relatively to the suspension rods and liability of said bolts shifting is reduced to a minimum through the medium of the bosses 13 extending through the spacer plate 11, this plate coöperating with the bolt 3 in properly supporting the suspension rods.

The springs 19 are normally under tension and cannot become accidentally displaced even though the shock absorber is constantly in use.

It is thought that the operation and utility of the spring support will be apparent without further description and we would have it understood that our invention is susceptible to such changes, as in the size, shape, use and elastic medium, as fall within the scope of the appended claims.

What we claim is:—

1. In a shock absorber, a bolt adapted to be connected to the rear end of the lower spring of a vehicle, suspension rods mounted upon the ends of said bolt, oppositely disposed stud bolts adapted to be connected to the rear end of the upper spring of the vehicle and having their heads formed with vertical openings and bosses through which said rods extend, a spacer plate mounted upon said bosses and against said heads, means engaging the bosses for supporting the spacer plate, a support at the lower ends of said rods, and means interposed between said plate and support and surrounding the rods for cushioning the movement of the plate.

2. In a shock absorber, a pair of oppositely disposed stud bolts adapted to be secured to the rear end of the upper spring of a vehicle and having their heads provided with vertical openings and bosses, suspension means adapted to be connected to the rear end of the lower spring of a vehicle and extending through said openings and bosses, a spacer plate mounted upon said bosses and abutting against said heads, means mounted upon the bosses for securing said spacer plate in position, and cushioning elements supported by said suspension means.

3. In a shock absorber, a pair of oppositely disposed stud bolts adapted to be connected to the rear end of the upper spring of a vehicle and having their heads provided with vertical openings and peripherally threaded depending bosses, suspension means adapted to be connected to the rear end of the lower spring of a vehicle and extending through said heads and bosses, a spacer plate mounted upon said bosses, nuts engaging said bosses for maintaining the spacer plate in position, and cushioning elements carried by said suspension means and abutting against said plate.

In testimony whereof we affix our signatures in the presence of two witnesses.

JAMES McNEIL.
ROBERT LIENHARD, Jr.

Witnesses:
MAX H. SROLOVITZ,
KATHERINE ERRETT.